(12) United States Patent
Brickett et al.

(10) Patent No.: US 7,025,254 B1
(45) Date of Patent: Apr. 11, 2006

(54) NON-VISUALLY IDENTIFIABLE FISHING GEAR

(75) Inventors: Benjamin P. Brickett, Eliot, ME (US); Scott Moffat, Kittery, ME (US)

(73) Assignee: Blue Water Concepts, Inc., Eliot, ME (US)

( * ) Notice: Subject to any disclaimer, the term of this patent is extended or adjusted under 35 U.S.C. 154(b) by 66 days.

(21) Appl. No.: 10/978,974

(22) Filed: Nov. 1, 2004

Related U.S. Application Data

(60) Provisional application No. 60/517,183, filed on Nov. 5, 2003.

(51) Int. Cl.
*G06F 17/00* (2006.01)

(52) U.S. Cl. .................. 235/375; 235/439; 235/487

(58) Field of Classification Search ............... 441/136, 441/1, 6, 11, 89, 133; 43/4, 7, 100; 114/326, 114/328; 340/539.1, 693.5, 572.1; 235/375, 235/385, 492, 493, 380, 382, 435, 449, 451, 235/487
See application file for complete search history.

(56) References Cited

U.S. PATENT DOCUMENTS

| | | | | |
|---|---|---|---|---|
| 440,582 | A * | 11/1890 | Bahlsen | 24/114.5 |
| 2,177,364 | A * | 10/1939 | Fotsch | 403/185 |
| 2,686,963 | A * | 8/1954 | Freyssinet | 264/249 |
| 3,475,795 | A * | 11/1969 | Youngblood | 24/122.6 |
| 3,600,765 | A * | 8/1971 | Rovinsky et al. | 24/122.6 |
| 3,676,899 | A * | 7/1972 | Ehlert | 403/247 |
| 3,722,014 | A * | 3/1973 | Hill et al. | 441/2 |
| 3,996,417 | A * | 12/1976 | Annas | 174/90 |
| 4,177,542 | A * | 12/1979 | Denney | 24/115 R |
| 4,262,379 | A * | 4/1981 | Jankiewicz | 441/2 |
| 4,734,961 | A * | 4/1988 | Guthmann | 24/122.6 |
| 4,980,989 | A * | 1/1991 | Davis | 43/100 |
| 5,390,581 | A * | 2/1995 | Hiltz et al. | 89/1.812 |
| 5,398,441 | A * | 3/1995 | Melanson | 43/100 |
| 5,415,490 | A * | 5/1995 | Flory | 403/267 |
| 5,906,170 | A * | 5/1999 | Robertson | 114/254 |
| 5,962,834 | A * | 10/1999 | Markman | 235/385 |
| 6,510,988 | B1 * | 1/2003 | Kraus | 235/382 |
| 6,598,800 | B1 * | 7/2003 | Schmit et al. | 235/462.44 |
| 6,676,061 | B1 * | 1/2004 | Cain | 242/401 |
| 6,747,561 | B1 * | 6/2004 | Reeves | 340/573.1 |
| 6,754,083 | B1 * | 6/2004 | Lin | 361/737 |
| 6,825,751 | B1 * | 11/2004 | Kita et al. | 340/5.61 |
| 2003/0169207 | A1 * | 9/2003 | Beigel | 343/718 |
| 2003/0179584 | A1 * | 9/2003 | Pond et al. | 362/487 |
| 2004/0100386 | A1 * | 5/2004 | Tendler | 340/573.3 |

FOREIGN PATENT DOCUMENTS

| | | | |
|---|---|---|---|
| GB | 2398454 | * | 8/2004 |
| WO | WO 8905460 | * | 6/1989 |
| WO | WO 20040320641 | * | 4/2005 |

* cited by examiner

*Primary Examiner*—Karl D. Frech
*Assistant Examiner*—Daniel Walsh
(74) *Attorney, Agent, or Firm*—Hayes Soloway PC

(57) ABSTRACT

A non-visual identification apparatus includes aquatic gear. At least one water-resistant device is joined with the aquatic gear. The water-resistant device stores information. A reader is provided that is capable of non-visually reading the information stored by the device. The water-resistant device may be joined mechanically and/or adhesively with the aquatic gear. The reader may be capable of wirelessly reading the information stored by the device.

16 Claims, 6 Drawing Sheets

```
┌─────────────────────────────────────────────────────┐
│  PUTTING THE WATER-RESISTANT DEVICE 214 AT THE END  │
│           OF AN INSERTION ROD 232                   │
│                       402                           │
└─────────────────────────────────────────────────────┘
                          │
┌─────────────────────────────────────────────────────┐
│  CAGING THE ROPE EXPOSING THE INTERSTICE OF PART    │
│                    OF THE ROPE                      │
│                       404                           │
└─────────────────────────────────────────────────────┘
                          │
┌─────────────────────────────────────────────────────┐
│  INSERTING THE WATER-RESISTANT DEVICE 214 IN THE    │
│      CAGED ROPE USING THE INSERTION ROD 232         │
│                       406                           │
└─────────────────────────────────────────────────────┘
                          │
┌─────────────────────────────────────────────────────┐
│  CREATING TENSION IN THE ROPE TO CLOSE THE CAGED    │
│                 PORTION OF THE ROPE                 │
│                       408                           │
└─────────────────────────────────────────────────────┘
                          │
┌─────────────────────────────────────────────────────┐
│   PULLING THE INSERTION ROD 232 FROM THE ROPE,      │
│  LEAVING THE WATER-RESISTANT DEVICE 214 WITHIN THE  │
│                       ROPE                          │
│                       410                           │
└─────────────────────────────────────────────────────┘
                          │
┌─────────────────────────────────────────────────────┐
│   SEALING THE WATER-RESISTANT DEVICE 214 TO THE     │
│    ROPE WITH AN EPOXY OR OTHER ADHESIVE 228         │
│                       412                           │
└─────────────────────────────────────────────────────┘
```

FIG. 5

NON-VISUALLY IDENTIFIABLE FISHING GEAR

CROSS-REFERENCES

This application claims priority to co-pending U.S. Provisional Application entitle, "non-Visually Identifiable Fishing Gear," having Ser. No. 60/517,183, filed Nov. 5, 2003, which is incorporated herein by reference.

FIELD OF THE INVENTION

The present invention is in the field of identification devices. Specifically, the present invention is in the field of non-visual identification means for equipment in a water environment.

BACKGROUND OF THE INVENTION

A substantial portion of the fishing industry involves fixed gear fishing. Fixed gear fishing involves the use of fishing equipment being left unattended in the water for a period of time and then collected, presumably once fish have been caught. One typical example of fixed gear is a lobster trap, which is often left at the bottom of the sea for anywhere from a day to a week and then reeled in and the traps are emptied.

Fixed gear fishing is regulated. Some regulations are in place to avoid decimation of the marine wildlife targeted by the fixed fishing gear. For instance, some regulations are placed on lobster fishing to avoid decimating the current lobster population. Other regulations are in place to avoid unintended harm to other marine wildlife. For instance, some regulations are placed on lobster fishing to avoid harm to the endangered right whales, which annually suffer casualties after becoming entangled in lobster fishing lines. Enforcement of these regulations requires being able to identify the owner of fixed gear while the fixed gear is unattended.

Current methods of marking fixed gear to identify the owner of fixed gear are visual in nature. One common method of marking gear is painting the buoys that support the fixed gear a different color for each fisherman. This method is effective for small numbers of fisherman, but can be confusing differentiating between large numbers of fisherman, particularly when the water discolors the buoys. Another known method of making fixed gear visually identifiable has been to tie colored threads to the ropes at various intervals. This system can handle larger volumes of fishermen but using multiple threads (e.g., one blue, one green, and one red identifies one fisherman, while two blue and a yellow identify another fisherman). This system again suffers the effect of the threads becoming discolored by the water. The threads may also break off during use of the rope and require regulators to get very close to the rope to make identification.

Thus, a heretofore unaddressed need exists in the industry to address the aforementioned deficiencies and inadequacies.

SUMMARY OF THE INVENTION

Embodiments of the present invention provide a system and method for non-visually identifying equipment in a water environment.

Briefly described, in architecture, one embodiment of the system, among others, can be implemented as follows. A non-visual identification apparatus includes aquatic gear. At least one water-resistant device is joined with the aquatic gear. The water-resistant device stores information. A reader is provided that is capable of non-visually reading the information stored by the device.

The present invention can also be viewed as providing methods for non-visually identifying equipment in a water environment. In this regard, one embodiment of such a method, among others, can be broadly summarized by the following steps: storing information on at least one water-resistant device; inserting the water-resistant device in aquatic gear; and non-visually reading the information stored on the device. The present invention can also be viewed as providing a system for non-visually identifying equipment in a water environment. In this regard, one embodiment of such a system, among others, can be broadly summarized by the following: means for storing information; means for making the means for storing information water-resistant; means for joining the means for storing information with the aquatic gear; and means for reading information off of the means for storing information.

Other systems, methods, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 5 is a flow diagram of a method of using the third exemplary embodiment of the present invention.

DETAILED DESCRIPTION

Figure 1:
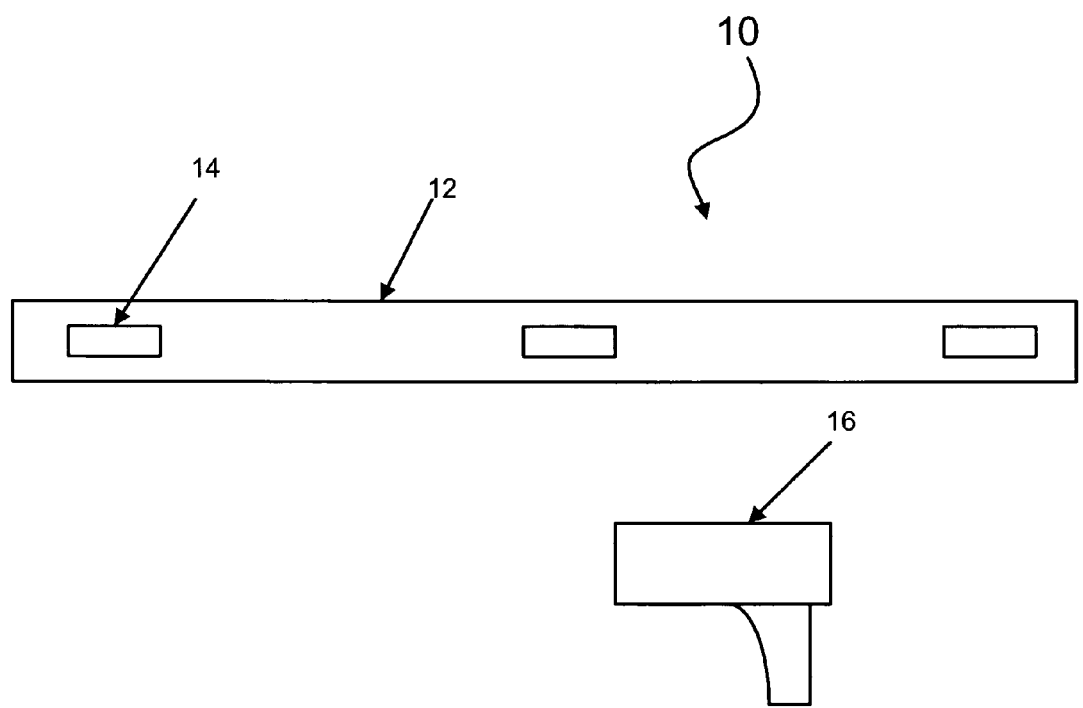
FIG. 1 is a cross-sectional view of a first exemplary embodiment of the present invention.

FIG. 1 contains a cross-sectional view of a first exemplary embodiment of the present invention. A non-visual identification apparatus 10 utilizes a cooperative identification system, in which the identifying agency and the object to be identified cooperate in the identification process according to a prearranged scheme. Specifically, the non-visual identification apparatus 10 is designed to be used with aquatic gear 12. At least one water-resistant device 14 is joined with the aquatic gear 12. The water-resistant device 14 stores information. A reader 16 is provided that is capable of non-visually reading, by induced electromagnetic or other energy carrier wave, the information stored by one or more the water-resistant devices 14.

The aquatic gear 12 can be any item that can be expected to be submersed in, operated on, or subjected to an aqueous environment. Aquatic gear 12, includes, but is not limited to, lobster traps, buoys, fishing rope, other fishing gear, nautical vessels, and scuba equipment.

Figure 2:
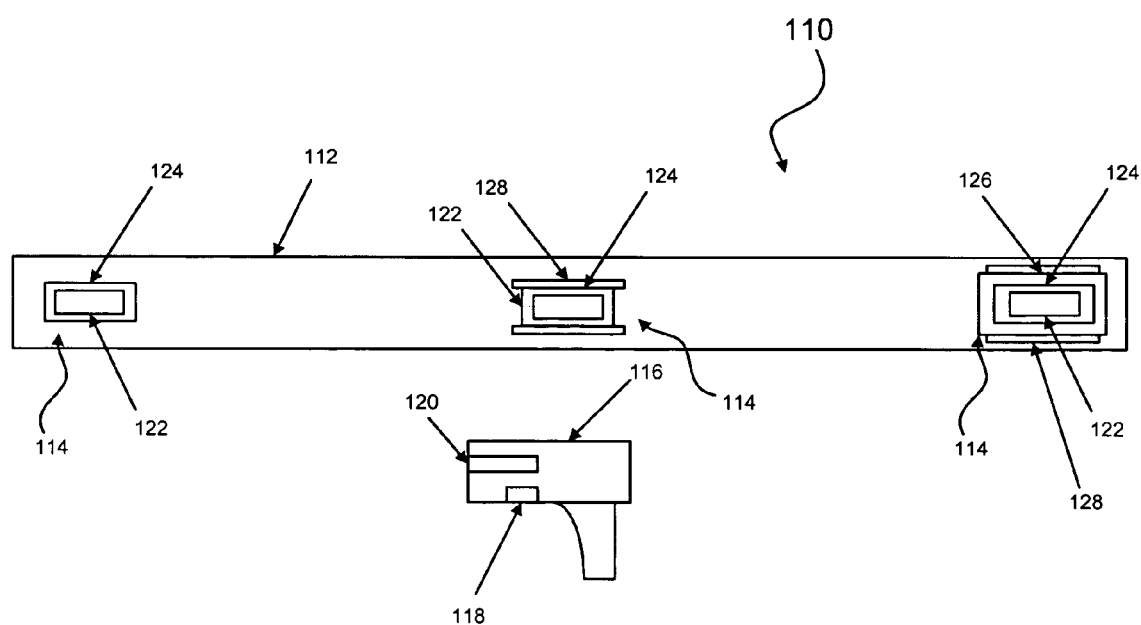
FIG. 2 is a cross-sectional view of a second exemplary embodiment of the present invention.

The water-resistant device 14 and reader 16 are capable of communication with each other. Communication may be achieved wirelessly or with a disconnectable wired connection. One applicable system for the water-resistant device 14 and reader 16 is an RFID (Radio Frequency Identification) system. A second exemplary embodiment of the present invention is shown in FIG. 2. In the RFID system shown, the water-resistant device 114 and reader 116 include an antenna 118, a transceiver 120 (with decoder), and a transponder tag 122 programmed with information.

The antenna 118 emits radio signals to activate the tag 122 and read and write data to it. The antenna 118 is the conduit between the tag 122 and the transceiver 120, which controls data acquisition and communication for the system 110. The antenna 118 can be packaged with the transceiver 120 with decoder to become the reader 116, which can be configured either as a handheld or a fixed-mount device. The reader 116 can be configured to emit radio waves in ranges of anywhere from one inch to 100 feet or more, depending upon its power output and the radio frequency used. These radio waves, called an activation signal, create an electromagnetic zone for the tags 122. When a transponder tag 122 passes through the electromagnetic zone, it detects the activation signal. The reader 116 decodes the data encoded in the tag 122 and the data is collected for processing.

Transponder tags 122 are categorized as either active or passive. Active transponder tags 122 are powered by an internal battery and are typically read/write, i.e., tag data can be rewritten and/or modified. Memory size for an active transponder tag 122 varies according to application requirements; some transponder tags 122 currently operate with up to 1 MB of memory. The battery-supplied power of an active transponder tag 122 generally gives it a longer read range. The trade off is greater size, greater cost, and a limited operational life (which may yield up to 10 years with current technology, depending upon operating temperatures and battery type).

Passive transponder tags 122 operate without a separate external power source and obtain operating power generated from the reader 116. Passive transponder tags 122 are consequently much lighter than active transponder tags 122, less expensive, and offer a virtually unlimited operational lifetime. The trade off is that they have shorter read ranges than active transponder tags 122 and require a higher-powered reader 116. Read-only tags 122 are typically passive and are programmed with a unique set of data (usually 32 to 128 bits) that cannot be modified.

In this second exemplary embodiment, the water-resistant device 114 can be an active or passive Transponder tag 122 having a hermetic seal 124. Hermetically sealing the tag 122 allows the integrated circuit within the tag 122 to be submersed in water for significant periods of time without water damage. However, the tag 122 and/or hermetic seal 124 may still be subject to physical damage if put in a location subject to significant strain, including crushing or bending damage.

Frequency ranges also distinguish RFID systems. Low-frequency (30 KHz to 500 KHz) systems have short reading ranges and lower system costs. High-frequency (850 MHz to 950 MHz and 2.4 GHz to 2.5 GHz) systems, offering long read ranges (greater than 90 feet) and high reading speeds. The high-frequency systems would allow reading of submersed tags 122 from the surface of a body of water if the tags 122 are submersed at a depth that is less than the range of the high frequency system.

Tags 122 can be read through the water, a hermetic seal 124, and many other materials in which the transponder tags 122 may be mounted, including the exterior of some aquatic gear 112. Transponder tags 122 can also be read in challenging circumstances at remarkable speeds, in most cases responding in less than 100 milliseconds. The read/write capability of an active RFID system is also a significant advantage in interactive applications such as work-in-process or maintenance tracking.

Other systems are contemplated by the present invention, including other types of wireless and optical technology.

As the water-resistant devices 114, which include transponder tags 122 and hermetic seals 124, are vulnerable to crushing and bending damage, the water-resistant devices 114 may be housed in a protective base 126. The protective base 126 may be constructed to both house the water-resistant devices 114 and mount within the aquatic gear 112.

An adhesive 128 may be used to join the water-resistant device 114 to the aquatic gear 112. If a base 126 is used, the adhesive 128 may be used to join the base 126 to the aquatic gear 112. The adhesive 128 must be effective in water. Epoxies function particularly well as the adhesive 128. Instead, or in addition, the water-resistant device 114 and/or base 126 may be joined mechanically to the aquatic gear 112. The base 126 may have hooks that latch to a rope, may be threadably attached to a buoy or lobster trap, or may be attached to aquatic gear 112 using other mechanical mechanisms known to those having ordinary skill in the art.

Figure 3:
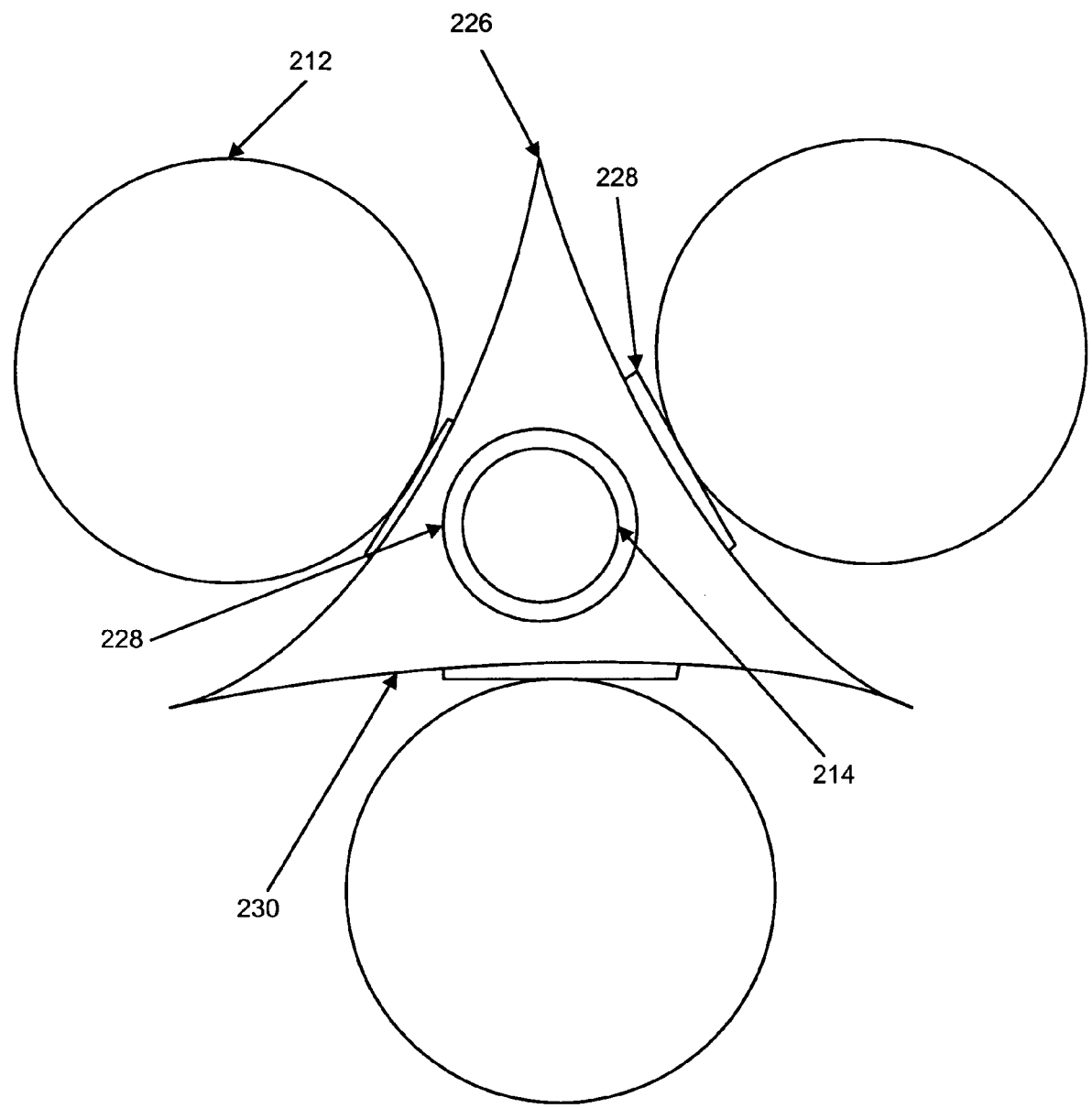
FIG. 3 is a cross-sectional view of a portion of a third exemplary embodiment of the present invention.

FIG. 3 shows a portion of a third exemplary embodiment, specifically containing a cross-section of one design for the base 226. The base 226, as shown, may be used to make the water-resistant device 214 more easily received by the aquatic gear 212, shown as a three-strand rope. The base 226 can have a triangular cross-section, which is a shape designed to be received within an interstice of a standard three-strand rope. Each side 230 of the triangular cross-section may be linear or it may be arcuate. An arcuate side 230 may be better shaped to fit within the interstice of the rope. An epoxy or other adhesive 228 may be used as a redundant method of retaining the base 214 within the aquatic gear 212.

Another feature of the invention embodied within the third exemplary embodiment is an adhesive 228 filling a gap between the base 226 and the water resistant device 214. One of the reasons for using a base 226 is to protect the water resistant device 214 and, in particular, the hermetic seal from breaking. The base 226, having a greater structural strength than the hermetic seal of the water resistant device 214, provides some protection from bending or crushing damage. However, the base 226 may still be bent a degree or two by significant force put on the rope in which the base 226 may be embedded. Even that minute bending can damage the hermetic seal in the water resistant device 214. Therefore, to avoid having the bending endured by the base 226 translated to the water resistant device 214, a gap may be provided between the water resistant device 214 and the base 226 sufficient to avoid translation of the bending force. To allow the base 226 to retain the water resistant device 214 with a gap there between, an adhesive 228 or similar substance unlikely to translate the bending force may be inserted between the base 226 and the water resistant device 214.

Figure 4:
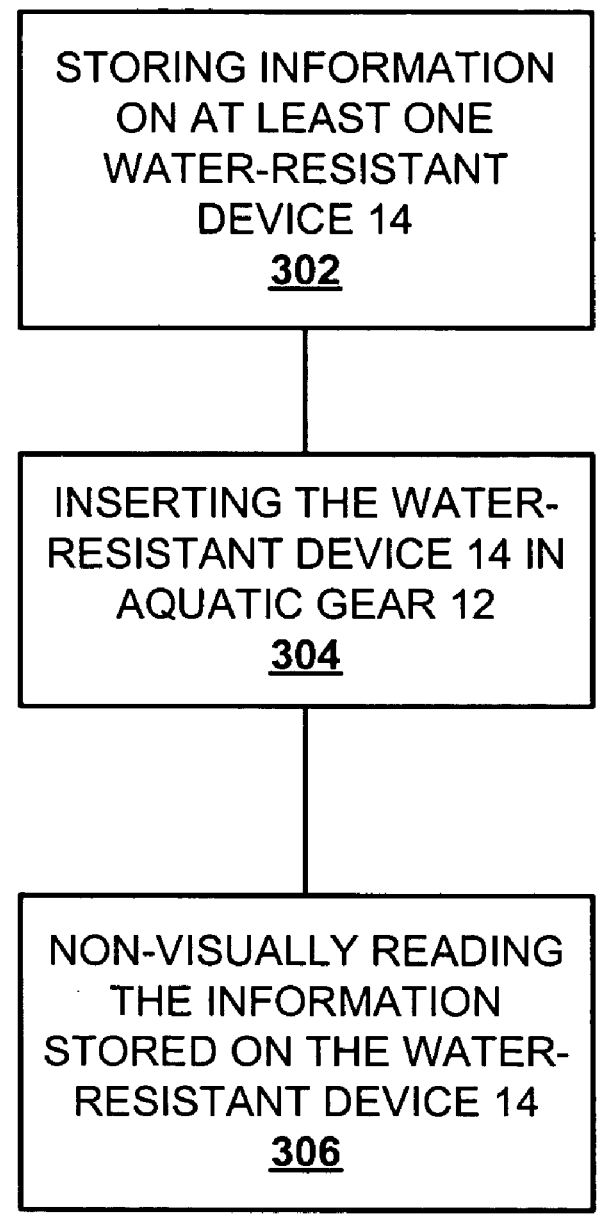
FIG. 4 is a flow diagram of a method of using the first exemplary embodiment of the present invention.

The flow chart of FIG. 4 shows the architecture, functionality, and operation of a possible implementation of the non-visual identification apparatus 10. In this regard, each block represents a module, segment, or step, which comprises one or more executable instructions for implementing the specified function. It should also be noted that in some alternative implementations, the functions noted in the blocks might occur out of the order noted in FIG. 4. For example, two blocks shown in succession in FIG. 4 may in fact be executed substantially concurrently or the blocks may sometimes be executed in the reverse order, depending upon the functionality involved, as will be further clarified herein.

The present invention includes a method 300 of using an non-visual identification apparatus 10 in an aquatic environment in accordance with the first exemplary embodiment. The method 300 includes storing information on at least one water-resistant device 14 (block 302). The method 300 also includes inserting the water-resistant device 14 in aquatic gear 12 (block 304). The method 300 also includes non-visually reading the information stored on the water-resistant device 14 (block 306).

The step of non-visually reading the information stored on the water-resistant device 14 (block 306) may further involve wirelessly reading the information stored on the water-resistant device 14. The step of inserting the water-resistant device 14 in aquatic gear 12 may further involve prefabricating the water-resistant device 14 in aquatic gear 12. The method 300 may also involve joining the water-resistant device 14 to the rope with an epoxy or other adhesive 28. The method 300 may also involve submerging the water-resistant device 14 in water. The method 300 may also include marking a location of the water-resistant device 14 in the aquatic gear 12 with a visual marker, such as a colored thread or other visual methods known to those having ordinary skill in the art.

Figure 6:
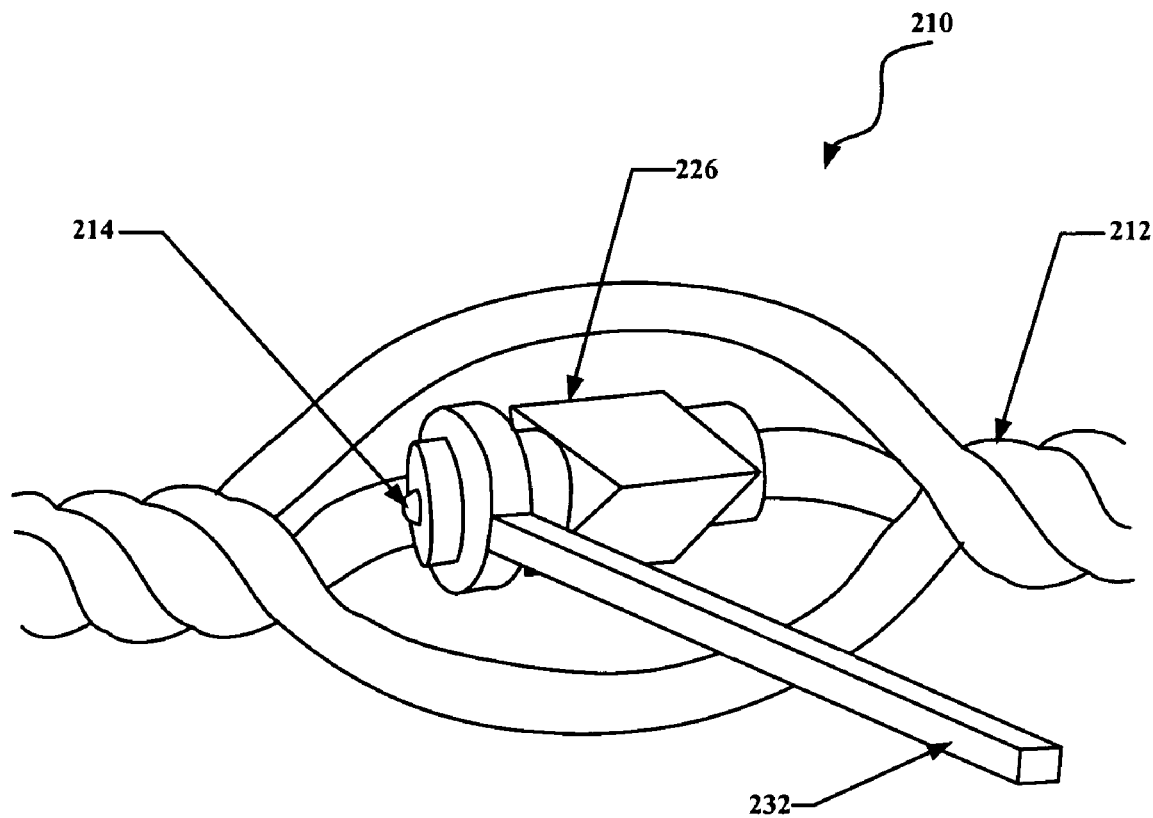
FIG. 6 is a perspective drawing illustrating one of the steps of the method of using the third exemplary invention, in accordance with FIG. 5.

As applied to the third exemplary embodiment, the step of inserting the water-resistant device 214 in aquatic gear 212 may further involve inserting the water-resistant device 212 in a length of rope, one type of aquatic gear 212. One method 400 for inserting the water-resistant device 214 in aquatic gear 212 is shown in FIG. 5 and partially illustrated in FIG. 6. The method 400 involves putting the water-resistant device 214 at the end of an insertion rod 232 (block 402). The method 400 also involves caging the rope exposing the interstice of part of the rope (block 404). The method 400 also involves inserting the water-resistant device 214 in the caged rope using the insertion rod 232 (block 406). The method 400 also involves creating tension in the rope to close the caged portion of the rope (block 408). The method 400 also involves pulling the insertion rod 232 from the rope, leaving the water-resistant device 214 within the rope (block 410). The method 400 may be practiced with the water-resistant device 214 held within the base 226. The method 400 may also involve sealing the water-resistant device 214 to the rope with an epoxy or other adhesive 228 (block 412).

It should be emphasized that the above-described embodiments of the present invention are merely possible examples of implementations, merely set forth for a clear understanding of the principles of the invention. Many variations and modifications, such as varying the shape of the base 226 and/or using various wireless technologies, may be made to the above-described embodiments of the invention without departing substantially from the spirit and principles of the invention. All such modifications and variations are intended to be included herein within the scope of this disclosure and the present invention and protected by the following claims.

What is claimed is:

1. An apparatus comprising:
   a three-strand rope;
   a base attachable to a water-resistant housing, wherein the base is within an interstice of the three-strand rope;
   at least one electronic device within the water-resistant housing wherein the electronic device further comprises a microchip;
   the base comprises a triangular cross-section shaped to be received within the interstice of the three-strand rope; and
   information stored by the electronic device.

2. The enclosure of claim 1, further comprising a reader that nonvisually reads the information stored by the electronic device.

3. The reader of claim 2, further comprising a reader that utilizes electromagnetic waves to read the information stored by the electronic device.

4. The enclosure of claim 1, further comprising an adhesive joining the base to the rope.

5. The enclosure of claim 1, further comprising a latching arrangement joining the base to the rope.

6. An enclosure for an aqueous environment, the enclosure comprising:
   a base;
   a gap, accommodating a microchip, within the base; and the base having a polygonal cross-section, the polygonal cross-section held within an interstice of a rope having a plurality of strands.

7. The enclosure of claim 6, wherein the base has at least one mechanical mechanisms to inhibit a movement of the base against the plurality of strands.

8. The enclosure of claim 6, wherein the base is held by a porous structure.

9. The enclosure of claim 6, further comprising:
   the rope;
   the base within the rope;
   the microchip within the base; and
   information stored by the microchip.

10. The enclosure of claim 6, further comprising an adhesive joining the electronic device to the rope.

11. The enclosure of claim 6, wherein the rope comprises three strands and the polygonal cross-section comprises a triangular cross-section shaped to be received within an interstice of the three-strand rope.

12. The enclosure of claim 6, further comprising an epoxy joining the base to the rope.

13. A method of inserting a base in a rope, the method comprising the steps of:
   caging a rope having a plurality of strands;
   inserting the base in an interstice of the rope wherein the base has a polygonal cross-section, the polygonal cross-section held within the interstice of the rope;
   compacting the rope to hold the base; and putting an electronic device storing information in the base.

14. The method of claim 13, further comprising the step of putting an electronic device in the base.

15. The method of claim 13, further comprising joining the base to the rope with an epoxy.

16. The method of claim 13, further comprising submerging the rope with the base therein in water.

* * * * *